(12) United States Patent
Huizinga (10) Patent No.: US 11,021,181 B2
(45) Date of Patent: Jun. 1, 2021

(54) MEDICAL TRANSPORT DEVICE, AUXILIARY DRIVE, AND METHOD FOR TRANSPORTING SUCH A TRANSPORT DEVICE

(71) Applicant: JOSH IP III B.V., Vriescheloo (NL)

(72) Inventor: Jozef Huizinga, Vriescheloo (NL)

(73) Assignee: JOSH IP III BV., Vriescheloo (NL)

(*) Notice: Subject to any disclaimer, the term of this patent is extended or adjusted under 35 U.S.C. 154(b) by 0 days.

(21) Appl. No.: 15/824,129

(22) Filed: Nov. 28, 2017

(65) Prior Publication Data
US 2018/0148080 A1 May 31, 2018

(30) Foreign Application Priority Data
Nov. 29, 2016 (NL) .................................... 2017890

(51) Int. Cl.
| B62B 5/00 | (2006.01) |
| A61G 5/04 | (2013.01) |
| A61G 7/08 | (2006.01) |
| A61G 7/10 | (2006.01) |
| B62B 1/12 | (2006.01) |
| B62B 1/00 | (2006.01) |

(52) U.S. Cl.
CPC .............. *B62B 5/0083* (2013.01); *A61G 7/08* (2013.01); *B62B 1/00* (2013.01); *B62B 1/12* (2013.01); *B62B 5/0046* (2013.01); *B62B 5/0073* (2013.01); *B62B 2202/42* (2013.01); *B62B 2207/00* (2013.01)

(58) Field of Classification Search
CPC ........ A61G 5/027; A61G 5/047; A61G 5/003; A61G 7/08; A61G 7/1046; A61G 7/1048; B62B 5/0026; B62B 5/0033; B62B 5/0079; B62B 5/0083; B62B 5/005; B62B 5/0087; B62B 5/0036; B62B 5/0043; B62B 5/0069; B62B 5/0073; B62B 2202/42; A61H 2003/043
USPC .................... 180/7.1, 21, 11, 12, 15, 16, 218
See application file for complete search history.

(56) References Cited

U.S. PATENT DOCUMENTS

| 3,407,411 A | * | 10/1968 | Stevens ................ A61G 7/1046 4/561.1 |
| 3,452,371 A | * | 7/1969 | Hirsch ................ A61G 7/1019 5/87.1 |

(Continued)

FOREIGN PATENT DOCUMENTS

| CN | 105836015 | * | 8/2016 | ............... B62B 5/00 |
| CN | 105836015 A | | 8/2016 | |

(Continued)

OTHER PUBLICATIONS

CN105836015, Wang, drawing only (Year: 2016).*
Dutch Search Report and Written Opinion for corresponding Dutch application NL 2017890 dated Jul. 19, 2017.

*Primary Examiner* — Anne Marie M Boehler
(74) *Attorney, Agent, or Firm* — Renner, Otto, Boisselle & Sklar, LLP (57) ABSTRACT

The invention relates to a medical transport device for dependent persons. The invention also relates to an auxiliary drive for the motorised transportation of such a medical transport device for dependent persons according to the invention. The invention furthermore relates to a method for transporting such a medical transport device for dependent persons according to the invention.

19 Claims, 7 Drawing Sheets

(56) References Cited

U.S. PATENT DOCUMENTS

| | | | |
|---|---|---|---|
| 4,020,916 A | | 5/1977 | Noble |
| 4,771,840 A | * | 9/1988 | Keller .................. B62B 5/0026 180/11 |
| 5,708,993 A | * | 1/1998 | Campbell ............ A61G 7/1019 177/144 |
| 6,443,252 B1 | * | 9/2002 | Andes .................... A61G 5/10 180/65.1 |
| 7,000,933 B2 | * | 2/2006 | Arling ................ B62D 51/008 180/218 |
| 7,021,407 B2 | * | 4/2006 | Ruschke .................. A61G 7/08 180/11 |
| 7,481,291 B2 | * | 1/2009 | Nishikawa ............. B62K 17/00 180/181 |
| 7,735,587 B1 | | 6/2010 | Stahlnecker |
| 9,272,589 B2 | * | 3/2016 | Yamano ................... B60D 1/00 |
| 9,744,095 B1 | * | 8/2017 | Mazzei .................... A61H 3/04 |
| 10,252,724 B2 | * | 4/2019 | Edney ................... B62K 23/08 |
| 10,285,894 B1 | * | 5/2019 | Haenel ..................... A61H 3/04 |
| 10,286,977 B1 | * | 5/2019 | Haenel .................. B62K 27/14 |
| 2003/0079923 A1 | | 5/2003 | Johnson |
| 2003/0155167 A1 | * | 8/2003 | Kamen .................. A63C 17/12 180/272 |
| 2003/0167567 A1 | * | 9/2003 | Reed .................... A61G 7/1046 5/86.1 |
| 2010/0025139 A1 | * | 2/2010 | Kosaka .................. B62D 61/00 180/218 |
| 2010/0237645 A1 | * | 9/2010 | Trainer ............... G09F 15/0087 296/21 |
| 2012/0029697 A1 | * | 2/2012 | Ota ........................ A61G 7/08 700/253 |
| 2013/0340167 A1 | | 12/2013 | Karwal et al. |
| 2014/0188338 A1 | * | 7/2014 | Ito ........................ B62D 51/001 701/41 |
| 2014/0189950 A1 | * | 7/2014 | Robbins ............... A61G 7/1048 5/86.1 |
| 2017/0203811 A1 | * | 7/2017 | Germanovsky ...... B62K 27/003 |
| 2018/0147281 A1 | * | 5/2018 | Tanaka .................. C07K 16/22 |

FOREIGN PATENT DOCUMENTS

| | | | | |
|---|---|---|---|---|
| DE | 102014100451 A1 | | 7/2015 | |
| EP | 1884439 A2 | | 2/2008 | |
| EP | 2724698 | * | 10/2013 | ............... A61G 5/04 |
| WO | 2013156030 A1 | | 10/2013 | |

* cited by examiner

MEDICAL TRANSPORT DEVICE, AUXILIARY DRIVE, AND METHOD FOR TRANSPORTING SUCH A TRANSPORT DEVICE

The invention relates to a medical transport device for dependent persons, and in particular a hoist lift for dependent persons. The invention also relates to an auxiliary drive for the motorised transportation of such a medical transport device. The invention furthermore relates to a method for transporting such a medical transport device.

Medical transport devices, such as hoist lifts, hospital beds and stretchers for moving dependent persons (patients) are usually accompanied and often also pushed or pulled by a care-providing person, such as a carer, nurse or doctor. This results in the respective caregiver, particularly in hospitals where the transport devices have to be moved over relatively large distances, have to cover large distances on foot, which requires a significant physical effort on the part of the caregiver on a daily basis. Pushing the transport devices which, if occupied by the dependent person, but also without being occupied by a dependent person, often have a considerable mass, requires a significant expenditure of effort. The caregiver's physical effort results in tiredness, overburdening and possible (permanent) injury, and consequently in reduced concentration on the part of the caregiver, thus endangering the primary process of the caregiver.

It is a first object of the invention to provide an improved medical transport device for dependent persons which can be transported by a caregiver in a relatively user-friendly way.

It is a second object of the invention to provide an auxiliary drive for enabling a caregiver to transport a medical transport device in a relatively user-friendly way.

To this end, the invention provides a medical transport device as described in the introduction, comprising: a mobile support structure configured for supporting a dependent person, which support structure is provided with at least one non-driven supporting wheel, and an auxiliary drive connected to the support structure for the motorised driving, and preferably (motorised) control, of the transport device, comprising: at least one driven supporting wheel, at least one electric motor, coupled with at least one driven supporting wheel, at least one electric motor coupled to the at least one driven supporting wheel for driving the at least one drive wheel, and a treadboard for a care-providing person, which treadboard is provided with a foot control device which is coupled to the at least one electric motor and is configured for actuating the at least one electric motor. The auxiliary drive connected to the support structure, the mobile support structure and thus the transport device are driven automatically, without any physical effort on the part of the care-providing person being required for this purpose. In addition, the treadboard provides space for the care-providing person who is consequently able to ride along with the transport device instead of having to walk alongside the transport device, thus substantially reducing the caregiver's physical effort, which in turn also significantly reduces the risk of injury, overtiredness and concentration issues. Due to the treadboard being provided with a foot control device, the care-providing person can (actuate) control the transport device in an upright position using his/her feet, thus leaving his/her hands free to perform care-providing tasks, for example. In addition, it has been found that operation of such a foot control device is very intuitive and can be mastered by means of a short learning curve, as a result of which only a small amount of experience or even no experience at all is required to move and manoeuvre the transport device in the desired way by means of one or both feet of the caregiver. Using the foot control device, a caregiver is usually also able to move the medical transport device in a more controlled way, since the caregiver no longer has to walk next to the transport device, but is standing on the foot control device, which results in more stability for the caregiver, which benefits the controlled operation of the medical transport device. The treadboard is configured to support the feet of a caregiver. In normal use, the caregiver will usually be standing on the treadboard. The foot control device can be operated relatively easily by the caregiver's foot when the caregiver is in this upright position. Therefore, at least part of the foot control device will be positioned in or on an upper side of the treadboard and/or project with respect to an upper side of the treadboard. It is also conceivable for the foot control device to be at least partly incorporated in the treadboard. In many cases, the treadboard also forms a housing for at least part of the foot control device. Usually, the treadboard is situated on an end side of the mobile support structure of the transport device, which usually makes transportation of the transport device easier. The mobile support structure of the medical transport device according to the invention comprises, for example, or is formed, for example, by a hospital bed, a hoist lift, a stretcher, or a wheelchair. The supporting wheels of the transport device are configured to support the transport device and therefore to allow the transport device to rest on a surface, often terra firma. The expression (foot-operated) motorised driving of the transport device is understood to mean regulating (modifying) the travel speed of the transport device, in forward and/or backward direction. The expression motorised and/or manually steering the transport device is understood to mean regulating (modifying) the travel direction (steering direction) of the transport device. Modifying the travel direction of the transport device (i.e. steering the transport device in a desired direction) is preferably effected at least partly, and preferably essentially entirely, by means of the foot control device.

The foot control device preferably comprises at least one pressure-sensitive operating surface configured for actuating at least one electric motor on the basis of a pressure exerted on the operating surface by a foot. In this case, one or more pressure-sensitive operating surfaces may, for example, form part of a (pressure-sensitive) pressure switch and/or piezo-electric sensor. It is also conceivable for one or more pressure-sensitive operating surfaces to be arranged on top of one or more pressure switches and/or one or more piezo-electric sensors. A pressure-sensitive operating surface has the advantage that the care-providing person can stand on the operating surface with one or both feet and can thus cause the driven supporting wheels to be driven via one or more electric motors, as a result of which the transport device will move. In this case, it is conceivable for the one or more operating surfaces to be configured and/or to be programmed to function in a discrete (stepwise) way, wherein the operating surface emits a single signal ("ON" signal) to the one or more electric motors coupled to the operating surface when the caregiver applies a load thereto, and emits no signal (or an "OFF" signal) when the caregiver does not apply a load to the operating surface. However, it is also conceivable for the one or more operating surfaces to be configured and/or programmed to function in a continuous way, in which the operating surface emits a signal ("ON" signal) to the one or more electric motors coupled to the operating surface when a load is applied, which continuous signal depends on the amount of load the caregivers applies, and emits no signal (or an "OFF" signal) if the caregiver does not apply a load to the operating surface. With such a continuous signal, the caregiver can easily determine the transport speed and/or transport direction of the transport device by applying a greater or smaller load on a pressure-sensitive operating surface. It is conceivable for the caregiver to apply a permanent load on one or more pressure-sensitive operating surfaces during operation. In this case, the transport speed and/or transport direction of the transport device can be regulated by shifting the pressure applied by the caregiver on the one or more pressure-sensitive operating surfaces. This pressure shift effected by the caregiver—usually a result of a weight shift by the caregiver—can be recognised by the one or more pressure-sensitive operating surfaces, as a result of which the one or more electric motors can be actuated. It is also conceivable for the foot control device to comprise at least one gyroscope which is configured to actuate at least one electric motor on the basis of tilting at least a part of the treadboard by means of a foot. This tilt will usually be limited to at most a few degrees with respect to a vertical axis and may even be minimal, in order to keep the treadboard sufficiently stable for a caregiver standing thereon. Preferably, the foot control device comprises at least two gyroscopes, at least one gyroscope of which is configured to record a tilting of a left-hand part of the treadboard (as a result of a load being applied to the left-hand part of the treadboard by the left foot of the caregiver), whereas at least one other gyroscope is configured to record a tilting of a right-hand part of the treadboard (as a result of a load being applied to the right-hand part of the treadboard by the right foot of the caregiver). In this case, it is advantageous if the left-hand part and the right-hand part of the treadboard are connected to each other so as to be pivotable (hingable). The gyroscopes are usually coupled to a control unit of the auxiliary drive. It is advantageous to calibrate the one or more gyroscopes at least once and, if desired, regularly. On the basis of the tilting of at least a part of the treadboard recorded by the at least one gyroscope, in particular the left-hand part and/or right-hand part, at least one drive wheel may be actuated. In this case, the drive wheel is usually driven in the direction of the detected tilting. This may also mean that, if the treadboard is not tilted, the one or more drive wheels are not activated. By means of a weight shift (and associated pressure shift) by the caregiver, the transport device can thus be controlled in a simple and intuitive way.

The treadboard, also referred to as footboard, usually comprises a housing in which for example electronics (including a control unit), one or more electric motors, one or more batteries connected to the one or more electric motors and the electronics and/or one or more wheel shafts are accommodated.

The advantage of using several electric motors is that it is possible, in this way, to drive, for example, several supporting wheels independently from one another. It is also conceivable for the several electric motors to cooperate with the same supporting wheel, in which case a first electric motor may, for example, be configured to make the supporting wheels rotate in a forward and/or backward direction, whereas a second electric motor may, for example, be configured for motorised swivelling of the respective swivel wheel, usually about a substantially vertical axis, as a result of which the transport direction may also be determined by means of the auxiliary drive.

Preferably, the auxiliary drive comprises at least one first driven supporting wheel which is coupled to the at least one first electric motor, and at least one second driven supporting wheel which is coupled to the at least one second electric motor. By using two supporting wheels which can be driven independently from each other, it is also easier for the caregiver to determine the transport direction of the transport device by using one or both feet. In particular by making one of the supporting wheels rotate more quickly than another supporting wheel, the transport device may be moved according to a non-linear (curved) path.

The foot control device preferably comprises at least one first pressure-sensitive operating surface which is coupled to the at least one first electric motor, and at least one second operating surface which is coupled to the at least one second electric motor. By using different operating surfaces to actuate different electric motors, one foot of the caregiver may be used to actuate the first electric motor and the other foot of the caregiver may be used to actuate the other electric motor, which benefits intuitive ease of use for the caregiver. In this case, it is conceivable for the foot control device to comprise one or more operating surfaces which are configured to support the left foot of the caregiver and for the foot control device to comprise one or more other operating surfaces to support the right foot of the caregiver. It is conceivable for the foot control device to comprise at least two pressure-sensitive operating surfaces which are coupled to the same electric motor. Usually, in this case, each pressure-sensitive operating surface which is coupled to the same electric motor will have its own unique function. Thus, it is advantageous if at least two pressure-sensitive operating surfaces coupled to the same electric motor are configured to actuate the aforementioned electric motor in a mutually opposite direction. In order to be able to increase the intuitive operation of these operating surfaces, it is advantageous if the at least two pressure-sensitive operating surfaces which are coupled to the same electric motor and are configured to actuate the aforementioned electric motor in a mutually opposite direction, are arranged one behind the other with respect to a transport direction of the transport device. In practice, the expression that a certain pressure-sensitive operating surface is configured to fulfil a certain function will usually mean that a control unit of the auxiliary drive will be programmed to convert the application of a load and the reduction of a load on a specific operating surface into a specific signal which is emitted to the one or more electric motors, as a result of which a desired functional movement of the one or more driven supporting wheels is achieved. In a particular preferred embodiment, the at least two pressure-sensitive operating surfaces which are coupled to the same electric motor and which are configured to actuate the aforementioned electric motor in a mutually opposite direction are collectively covered by a foot pedal which is connected to the operating surfaces and is preferably profiled. In this case, the foot pedal may be connected to another part of the treadboard between the operating surfaces. This connection may optionally be a hinged connection (pivotable connection), as a result of which it is easier for a caregiver to apply a load to an operating surface and reduce a load on another operating surface. An upper side of the foot pedal is preferably designed to be profiled and/or may, for example, be provided with slip-resistant material. The foot pedal is preferably sufficiently large to allow a caregiver's foot to rest on it in a secure manner. A length of the foot pedal of at least 30 centimetres and a width of the foot pedal of at least 20 centimetres would, for example, be suitable for this purpose. It will be clear that the foot pedal may also have different dimensions and may, for example, even be smaller than a foot (shoe) of the caregiver. Preferably, each set consisting of pressure-sensitive operating surfaces which are coupled to the same electric motor and configured to actuate the aforementioned electric motor in a mutually opposite direction, is covered by a dedicated, preferably profiled, foot pedal configured to support the care-providing person. In this case, usually at least two foot pedals are used, at least one left foot pedal for the left foot and at least one right fight pedal for the right foot of the caregiver, in which case at least two—functionally different—operating surfaces are arranged under each foot pedal. It is conceivable for the functionally different operating surfaces to be connected to each other. This may be achieved, for example, by enabling the foot control device to detect which part (which location) of the operating surface is loaded. It is conceivable for the treadboard to comprise a left segment and a right segment which is connected to the left segment. The left segment, optionally provided with the aforementioned left foot pedal, is in this case configured to support the left foot of the caregiver, while the right segment, optionally provided with the aforementioned right foot pedal, is configured to support the right foot of the caregiver. The left segment and the right segment may be connected to each other in a rigid way and/or so as to form a single part. However, it is also conceivable for the left segment and the right segment to be connected to each other in a movable way, in particular in a pivotable (hingable) way. In this case, the pivot axis preferably extends in the horizontal plane.

It is conceivable for the auxiliary drive to comprise at least one optical light source, in particular at least one infrared light source, and for the auxiliary drive to also comprise at least one light sensor, in particular at least one infrared sensor. Using the combination of at least one light source and at least one light sensor makes it possible to determine in a relatively efficient way whether or not a caregiver is applying a load to the treadboard. Usually, the at least one light source and the at least one light sensor will be arranged under at least one foot pedal and/or at least one pressure-sensitive operating surface. In the unloaded state of the treadboard, the light source and the light sensor are in optical contact, with the light sensor being able to sense a light beam emitted by the light source. When applying a load to the treadboard, in which case the caregiver will stand on at least one foot pedal and/or at least one pressure-sensitive operating surface, at least one foot pedal and/or at least one pressure-sensitive operating surface will then, at least partly, be pushed in a downward direction, as a result of which the optical connection is interrupted. The aforementioned optical detection may prevent drive wheels from being inadvertently activated when no load is applied on the treadboard by a caregiver, which is particularly advantageous from the point of view of safety.

Preferably, the auxiliary drive comprises several driven supporting wheels which are substantially arranged on either side of the treadboard. By providing the treadboard with driven supporting wheels on either side, it is possible to provide an effective auxiliary drive which can be controlled in an intuitive and user-friendly manner by the caregiver in a relatively inexpensive and simple manner. In this case, a wheel shaft of each supporting wheel will usually be connected to (a housing of) the treadboard. With such a positioning, each driven supporting wheel will usually only be rotatable (mono)axially about a wheel shaft and each driven supporting wheel will only be configured to turn in a forward or backward direction. In addition, it is also conceivable to use at least one driven supporting wheel which is biaxially rotatable about a substantially horizontal axis and a substantially vertical axis, as a result of which, de facto, a driven swivel wheel is created, whose direction of rotation and whose orientation with respect to the mobile support structure and/or the treadboard may be modified in a motorised way, usually by using several electric motors.

One circumferential side of at least one driven supporting wheel is preferably provided with a tread surface comprising polymer, for which purpose, for example, rubber may be used. The tread surface is preferably solid and therefore preferably not filled with air, which usually benefits the durability and maintenance of the driven supporting wheels. Obviously, if desired, the driven supporting wheels may also be filled with air or may, for example, be designed as a caterpillar track.

In a preferred embodiment, at least part of the treadboard is connected to the support structure in a substantially fixed manner. This fixed (rigid) connection between the treadboard and the support structure usually has a beneficial effect on the transportation of the transport device according to the invention by the caregiver in a controlled way. In this case, left-hand and/or right-hand impulses directly result in the transport device being steered in a desired direction in an intuitive way. In addition, such a substantially rigid connection increases the caregiver's stability during transport. Nevertheless, it is also conceivable for at least part of the treadboard to be pivotably connected to the support structure. In this last variant embodiment, the maximum pivot angle is preferably limited to, for example, −45 degrees to +45 degrees, in particular −30 degrees to +30 degrees. If the treadboard is pivotably connected to the mobile support structure, it is conceivable that regulating the transport direction of the transport device is achieved by the care-providing person exerting a force on the support structure.

In an advantageous embodiment of the transport device according to the invention, the treadboard is rotatable (pivotable) with respect to the mobile support structure, preferably about an axis which is substantially perpendicular to a displacement plane of the transport device (substantially vertical axis). In this case, the treadboard may be pivoted in a lateral direction, for example through an angle of between −90 and +90 degrees. This may be beneficial for controlling (steering) the transport device in certain situations and/or for parking the transport device. In this case, the at least one driven supporting wheel is preferably also rotatable, based on the treadboard, with respect to the mobile support structure about an axis which is substantially perpendicular to a displacement plane of the transport device (substantially vertical axis). If the one or more driven supporting wheels are arranged at a distance from the support platform and are not directly connected thereto, a rotation of the treadboard may be detected electronically, which results in a substantially similar rotation of the one or more driven supporting wheels. This makes it possible to direct the treadboard in the desired transport direction of the transport device, which benefits the ease of use and the ease of steering for the caregiver. It is preferred if the treadboard can be fixed in at least one preferred position with respect to the mobile support structure. In this case, a first preferred position may, for example, be formed by an orientation of the treadboard in which a front part of the treadboard is substantially completely turned towards the mobile support structure in order to be able to move the transport device in the longitudinal direction, and a second preferred position may be formed by a transverse orientation of the treadboard with respect to the mobile support structure, in which only one single end side of the treadboard is turned towards the mobile support structure in order to be able to move the transport device in the transverse direction. In this case, the treadboard can preferably be fixed with respect to the mobile support structure in both preferred positions. Locking and unlocking the treadboard with respect to the support structure is usually performed manually and can usually be achieved in a simple manner by the caregiver himself.

In a preferred embodiment, the treadboard is movable between an operational and a non-operational position, with the treadboard in the operational position providing space to support a care-providing person. In the non-operational position of the treadboard, the treadboard may occupy a reduced surface area projected onto the displacement plane compared to the operational position. As a result thereof, the footprint of the treadboard in the non-operational position is reduced compared to the operational position. It is also conceivable, if one or more driven supporting wheels are (directly) connected to the treadboard, for the aforementioned one or more supporting wheels to be positioned at a distance from the surface (terra firma) in the non-operational position. Usually, the operational position will involve a folded-out position of the treadboard and the non-operational position will involve a folded, folded-up, retracted and/or upwardly displaced position of the treadboard. This makes it possible to limit the so-called footprint of the transport device as such during stationary use of the transport device, which results in a space saving. In addition, it makes it easier to move the transport device laterally, in particular in tight spaces. An additional advantage of the movable/displaceable treadboard is the fact that the transport device remains usable and (manually) wheelable if the auxiliary drive failes as the auxiliary drive can be placed at a distance from the terra firma situated underneath.

The auxiliary drive preferably comprises a coupling structure for coupling the auxiliary drive to the support structure. The coupling structure may be formed, for example, by a rod or by a frame which is composed of one or more rods. The coupling structure is also referred to as a bridge. It is conceivable for the coupling structure to be configured for releasably coupling the auxiliary drive to the mobile support structure. This has the significant advantage that conventional non-driven hoist lifts, hospital beds, wheelchairs and the like can be provided with a motorised drive in a relatively simple way by coupling with the auxiliary drive. The auxiliary drive may thus be incorporated with the mobile support structure, but may also be modular, designed as an add-on module. The coupling of the auxiliary drive to the mobile support structure is preferably effected by clamping the auxiliary drive to the mobile support structure, preferably to a push handle of the mobile support structure. To this end, the coupling structure preferably comprises at least one clamping element for connecting the auxiliary drive to the mobile support structure in a clamping manner. It is also possible for the coupling structure to be connected to the mobile support structure in another way, in which by means of click-fitting, hooking and/or docking.

It is conceivable for the treadboard and/or the at least one driven supporting wheel to be connected to the coupling structure in a displaceable, in particular pivotable, manner. In this case, it is particularly advantageous if the treadboard and/or the at least one driven supporting wheel is displaceably, in particular pivotably, preferably substantially freely (unobstructedly) hingable, in an upward direction with respect to the coupling structure. This not only makes it possible, for example, to pivot the treadboard with respect to the coupling structure, as a result of which the treadboard could be folded away, but also makes it possible to improve transportation of the transport device across uneven surfaces, for example surfaces provided with thresholds. A (separate) resilient suspension of the treadboard and/or the at least one driven supporting wheel may thus be omitted, which may result in significant cost savings. In this case, it is usually advantageous if the auxiliary drive comprises forcing means for forcing the treadboard and/or the at least one driven supporting wheel in a downward direction and/or in an upward direction. The forcing means are usually formed by one or more resilient elements. Forcing the treadboard in a downward direction usually benefits the stability of the treadboard, with the transport device also being suitable for transportation across uneven surfaces. Forcing the treadboard and/or the at least one driven supporting wheel in an upward direction may result in the treadboard and/or the at least one driven supporting wheel being released from the terra firma situated underneath in the unloaded state (i.e. when the caregiver is not applying a load), which may significantly facilitate manual displacement of the transport device.

Preferably, at least one of the at least one non-driven supporting wheel and the at least one drive wheel is pivotably connected to the transport device. In many cases, all non-driven supporting wheels are formed by swivel wheels. These swivel wheels may optionally be lockable in a specific orientation with respect to the mobile support structure.

It is advantageous if at least part of a support surface of the treadboard is provided with a slip-resistant material so that the caregiver can rest on the treadboard in a secure manner. This support surface may for example form part of the abovementioned foot pedal, but may also be another part of (an upper side) of the the treadboard.

The one or more electric motors of the auxiliary drive are usually provided with energy (electric power) by means of one or more batteries of the auxiliary drive. Preferably, the battery is at least partly accommodated in a (hollow) frame part of the auxiliary drive which is beneficial for the volume taken up by the auxiliary drive and, in addition, is more aesthetically pleasing than when the battery is mounted in a visible way. The battery is preferably connected to a charging terminal, with the charging terminal more preferably being incorporated in and/or accommodated in an outer side of (a frame part of) the auxiliary drive. Preferably, the charging terminal is positioned sufficiently high, more preferably higher than 1 metre (from an underside of the auxiliary drive), as a result of which the caregiver can easily reach the charging terminal. This makes it possible to charge the at least one battery of the auxiliary drive in an efficient manner. Optionally, the auxiliary drive is also provided with a manually operable switch (circuit breaker) which may function as an emergency stop for the caregiver. The circuit breaker interrupts the supply of electric power to the at least one electric motor, as a result of which electric displacement of the auxiliary drive can be stopped.

As has already been indicated, the auxiliary drive will usually comprise a control unit which is configured to actuate the at least one electric motor, and thus the one or more driven supporting wheels, via operation of the foot control device.

The invention also relates to an auxiliary drive which is clearly intended for the motorised displacement of a medical transport device for dependent persons, in particular a transport device according to the invention, comprising: a coupling structure for, preferably releasably, coupling the auxiliary drive to a mobile support structure of the transport device, at least one driven supporting wheel, at least one electric motor coupled to at least one drive wheel for driving the at least one drive wheel, and a treadboard for a care-providing person, which treadboard is provided with a foot control device coupled to the at least one electric motor and configured for actuating the at least one electric motor. Advantages and variant embodiments of the auxiliary drive have already been described in detail above.

The invention further relates to a method for the motorised displacement of a medical transport device for dependent persons according to the invention, comprising the following steps: A) allowing a care-providing person to position themselves on the treadboard, and B) the care-providing person actuating at least one electric motor via the foot control device of the auxiliary drive, as a result of which at least one supporting wheel of the auxiliary drive is driven, resulting in a displacement of the transport device. Preferably, the auxiliary drive is coupled to the mobile support structure of the transport device prior to step A). This coupling may be releasable in nature. Advantages and variant embodiments of the method for operating the transport device according to the invention have also already been described in detail above.

Preferred embodiments of the invention are described in the following non-limiting clauses:

1. Medical transport device for dependent persons, in particular a hoist lift for dependent persons, comprising:
    a mobile support structure configured for supporting a dependent person, which support structure is provided with at least one non-driven supporting wheel, and
    an auxiliary drive connected to the support structure for the motorised driving of the transport device, comprising:
        at least one driven supporting wheel,
        at least one electric motor coupled to at least one driven supporting wheel for driving the at least one drive wheel, and
        a treadboard for a care-providing person, which treadboard is provided with a foot control device coupled with the at least one electric motor and configured for actuating the at least one electric motor.

2. Transport device according to clause 1, in which the foot control device comprises at least one pressure-sensitive operating surface configured for actuating at least one electric motor on the basis of a pressure exerted on the operating surface by a foot.

3. Transport device according to clause 2, in which at least one pressure-sensitive operating surface forms part of a pressure switch.

4. Transport device according to clause 3 or 4, in which at least one pressure-sensitive operating surface forms part of a piezo-electric sensor.

5. Transport device according to one of the preceding clauses, in which the auxiliary drive comprises at least one first electric motor and at least one second electric motor.

6. Transport device according to clause 5, in which the auxiliary drive comprises at least one first driven supporting wheel coupled to the at least one first electric motor, and at least one second driven supporting wheel coupled to the at least one second electric motor.

7. Transport device according to clause 5 or 6, in which the foot control device comprises at least one first pressure-sensitive operating surface coupled to the at least one first electric motor, and at least one second operating surface coupled to the at least one second electric motor.

8. Transport device according to one of the clauses clause 4-7, in which the foot control device comprises at least two pressure-sensitive operating surfaces which are coupled to the same electric motor.

9. Transport device according to clause 8, in which at least two pressure-sensitive operating surfaces which are coupled to the same electric motor are configured for actuating the aforementioned electric motor in a mutually opposite direction.

10. Transport device according to clause 9, in which the at least two pressure-sensitive operating surfaces which are coupled to the same electric motor and are configured for actuating the aforementioned electric motor in a mutually opposite direction are arranged one behind the other with respect to a transport direction of the transport device.

11. Transport device according to clause 8 or 9, in which the at least two pressure-sensitive operating surfaces which are coupled to the same electric motor and which are configured for actuating the aforementioned electric motor in a mutually opposite direction are collectively covered by a foot pedal which is connected to the operating surfaces and is preferably profiled.

12. Transport device according to clause 11, in which each set consisting of pressure-sensitive operating surfaces which are coupled to the same electric motor, and which are configured for actuating the aforementioned electric motor in a mutually opposite direction are covered by a dedicated, preferably profiled, foot pedal which is configured to support the care-providing person.

13. Transport device according to one of the preceding clauses, in which the auxiliary drive comprises several driven supporting wheels which are substantially arranged on either side of the treadboard.

14. Transport device according to one of the preceding clauses, in which at least one driven supporting wheel is biaxially rotatable.

15. Transport device according to one of the preceding clauses, in which at least one driven supporting wheel is provided with a tread surface comprising a polymer.

16. Transport device according to one of the preceding clauses, in which at least part of the treadboard is connected to the support structure in a substantially fixed manner.

17. Transport device according to one of the preceding clauses, in which the treadboard and the at least one driven supporting wheel are rotatable with respect to the mobile support structure in dependence on one another, preferably about an axis which is substantially perpendicular to a displacement plane of the transport device.

18. Transport device according to one of the preceding clauses, in which the mutual orientation of the treadboard and the mobile support structure is modifiable, in which the treadboard can be fixed in several orientations with respect to the mobile support structure.

19. Transport device according to clause 18, in which the treadboard can be fixed with respect to the mobile support structure in several orientations rotated about a substantially vertical axis with respect to each other.

20. Transport device according to one of the preceding clauses, in which the treadboard is movable, preferably manually, with respect to the mobile support structure between an operational and a non-operational position, in which the treadboard, in the operational position, provides space to support a care-providing person and, in the non-operational position, occupies a reduced surface area projected onto the displacement plane compared to the operational position.

21. Transport device according to one of the preceding clauses, in which the auxiliary drive comprises a coupling structure for coupling the auxiliary drive to the support structure.

22. Transport device according to clause 21, in which the coupling structure is configured for releasably coupling the auxiliary drive to the mobile support structure.

23. Transport device according to clause 21 or 22, in which the coupling structure comprises at least one clamping element for connecting the auxiliary drive to the mobile support structure in a clamping manner.

24. Transport device according to one of the clauses 21-23, in which the treadboard and/or the at least one driven supporting wheel is displaceably, in particular pivotable in an upward and/or downward direction, connected to the coupling structure.

25. Transport device according to clause 24, in which the auxiliary drive comprises forcing means for forcing the treadboard and/or the at least one driven supporting wheel in a downward direction and/or an upward direction.

26. Transport device according to clause 24, in which the auxiliary drive is free from forcing means for forcing the treadboard and/or the at least one driven supporting wheel in a downward direction and/or an upward direction.

27. Transport device according to one of the clauses, in which at least one of the at least one non-driven supporting wheel and the at least one drive wheel is pivotably connected to the transport device.

28. Transport device according to one of the preceding clauses, in which at least part of a support surface of the treadboard is provided with a slip-resistant material.

29. Transport device according to one of the preceding clauses, in which the transport device, in particular the auxiliary drive, comprises a battery for providing the at least one electric motor with power.

30. Transport device according to one of the preceding clauses, in which the battery is at least partly accommodated in a frame part of the auxiliary drive.

31. Transport device according to clause 29 or 30, in which the battery is connected to a charging terminal, in which the charging terminal is incorporated in an outer side of the auxiliary drive.

32. Transport device according to one of the preceding clauses, in which the auxiliary drive comprises a control unit which is configured to actuate the at least one electric motor via operation of the foot control device.

33. Transport device according to one of the preceding clauses, in which the foot control device comprises at least one gyroscope which is configured to actuate at least one electric motor on the basis of tilting the treadboard by means of a foot.

34. Transport device according to one of the preceding clauses, in which the auxiliary drive comprises at least one manual switch for switching off the at least one electric motor.

35. Auxiliary drive clearly intended for the motorised displacement of a medical transport device for dependent persons, in particular a transport device according to one of the preceding clauses, comprising:
   a coupling structure for coupling the auxiliary drive to a mobile support structure of the transport device,
   at least one driven supporting wheel,
   at least one electric motor coupled to at least one drive wheel for driving the at least one drive wheel, and
   a treadboard for a care-providing person, which treadboard is provided with a foot control device coupled to the at least one electric motor and configured for actuating the at least one electric motor.

36. Method for the motorised displacement of a medical transport device for dependent persons according to one of the clauses 1-34, comprising the following steps:

A) allowing a care-providing person to position themselves on the treadboard, and
B) the care-providing person actuating at least one electric motor via the foot control device of the auxiliary drive, as a result of which at least one supporting wheel of the auxiliary drive is driven, resulting in a displacement of the transport device.

37. Method according to clause 34, in which the auxiliary drive is coupled to the mobile support structure of the transport device prior to step A).

The present invention will be explained in more detail by means of the non-limiting illustrative embodiments illustrated in the following figures, in which.

In the figures and in the following description of the figures, identical reference numerals denote similar elements or components.

Figures 1, 2, 3:
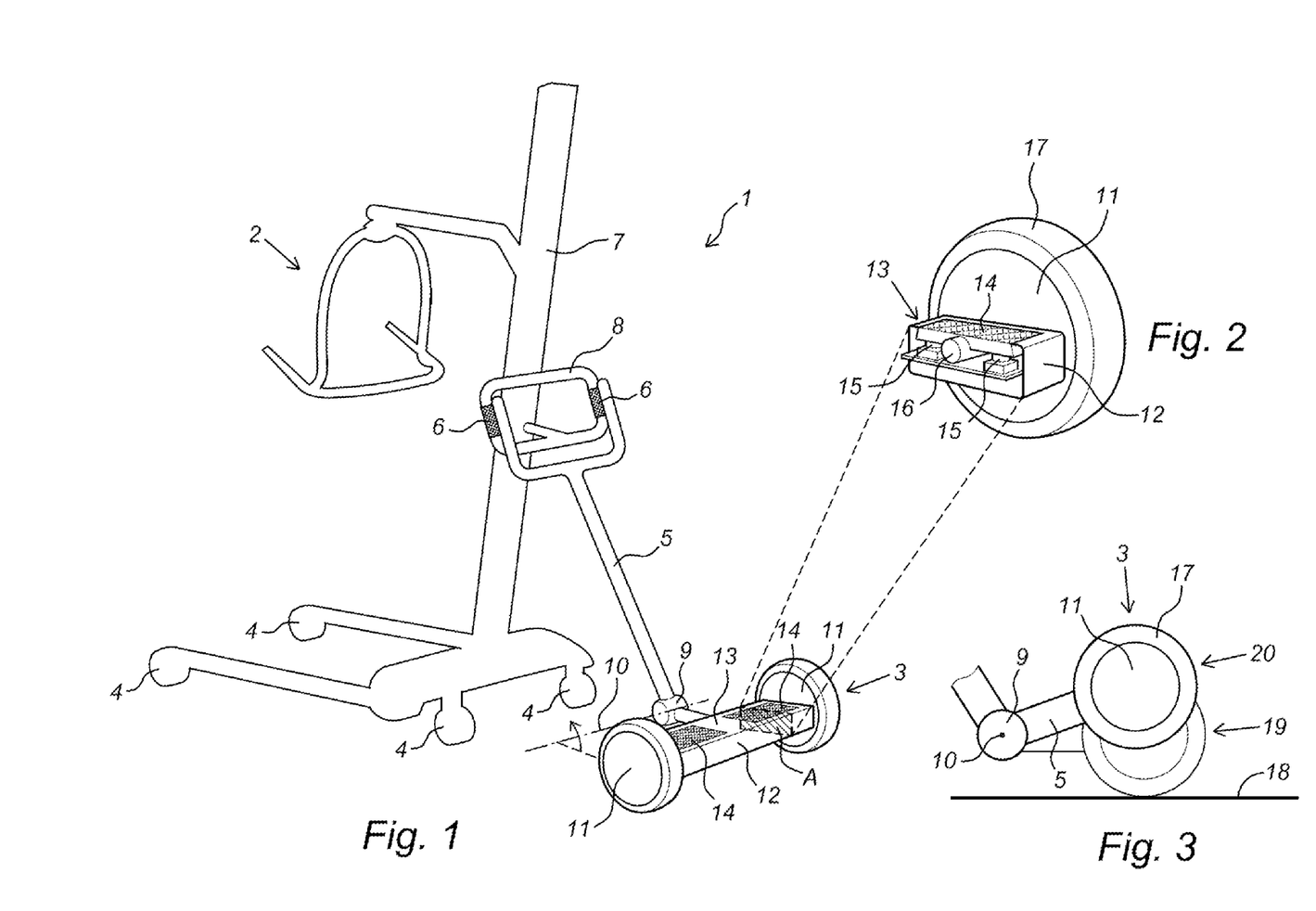
FIG. 1 shows a perspective view of an embodiment of a medical transport device according to the present invention.
FIG. 2 shows a cross section along a plane A of a part of the medical transport device as illustrated in FIG. 1.
FIG. 3 shows a side view of a part of the medical transport device as illustrated in FIG. 1.

FIG. 1 shows a perspective view of an embodiment of a medical transport device 1 for dependent persons according to the present invention. The transport device 1 comprises a mobile support structure 2 for supporting a dependent person, in the present embodiment a hoist lift, which is connected to an auxiliary drive 3 for driving the transport device 1. However, in the context of the invention, it is also possible for the mobile support structure 2 to be formed by another transport means, such as a (hospital) bed, a wheelchair or a stretcher. The support structure 2 is supported by four supporting wheels 4, the two rearmost of which are preferably pivotable so that a rear side of the support structure 2 can swing out and thus steer the transport device 1. The support structure 2 is coupled to the auxiliary drive 3 by means of a coupling structure 5. The coupling structure 5 is provided with clamping elements 6 which engage with the frame 7, and in particular a handle 8 of the support structure 2. In this case, the clamping elements 6 are preferably configured such that they can be detached from the handle 8 with which they engage. The coupling structure furthermore comprises a joint 9 with a rotation axis 10 about which the auxiliary drive 3 can rotate with respect to the support structure 2. By optionally using forcing means which are provided in the joint 9, the auxiliary drive 3 is forced in the direction of the displacement plane of the transport device 1. The auxiliary drive 3 comprises two supporting wheels 11 which are driven by one or more electric motors (not shown), which supporting wheels 11 support a treadboard 12 for a care-providing person. The treadboard 12 comprises a support surface 13, at least part of which may be provided with a slip-resistant material. Two foot pedals 14 are incorporated in the support surface 13 for actuating the at least one electric motor and thus the driven supporting wheels 11 coupled to the electric motor.

FIG. 2 shows a cross section along a plane A of a part of the medical transport device as illustrated in FIG. 1. It shows a part of the treadboard 12 which defines a support surface 13 on its upper side. A foot pedal 14 is incorporated in the support surface and covers two operating surfaces in the form of pressure switches 15. The foot pedal is tiltable about an axle 16, with the foot pedal coming into contact with one of the pressure switches 15 upon tilting and pushing the respective pressure switch 15. When pushed, the pressure switches 15 are in this case configured to actuate the electric motor in a mutually opposite direction in order thus to modify the direction of rotation of the driven supporting wheels 11 coupled to the electric motor. The pressure switches 15 may in this case also be configured to regulate the rotational speed of the electric motor on the basis of the pressure exerted on the pressure switches 15. If each of the driven supporting wheels 11 is coupled to another electric motor, the auxiliary drive 3 can be controlled by mutually varying the rotational speed and direction of rotation of the electric motor and thus the driven supporting wheels 11 coupled to the electric motor, by means of which the transport direction of the transport device 1 can be changed. On an outer side thereof, the driven supporting wheels 11 define a tread surface 17, which tread surface 17 is preferably made of a polymer, resulting in a substantially inelastic tread surface 17.

FIG. 3 shows a side view of a part of the medical transport device 1, as illustrated in FIG. 1, in which a coupling structure 5 and an auxiliary drive 3 coupled to the coupling structure 5 and provided with a driven supporting wheel 11 can be seen. As has already been mentioned above, the coupling structure 5 comprises a joint 9 with a rotation axis parallel to the displacement plane 18 about which the auxiliary drive 3 can rotate with respect to the support structure 2. Optionally, forcing means provided in the joint 9 may be used to force the auxiliary drive 3 in the direction of the displacement plane 18 of the transport device 1. In addition, the option of rotating the treadboard 12 may be used to move the treadboard 12 between an operational 19 and a non-operational position 20. In the operational position 19, the driven supporting wheel 11 comes into contact with the displacement plane 18 and the treadboard 12 provides space to support a care-providing person. In the non-operational (folded-up) position 20, the treadboard 12 occupies a reduced surface area projected onto the displacement plane 18 compared to the operational position.

Figure 4:
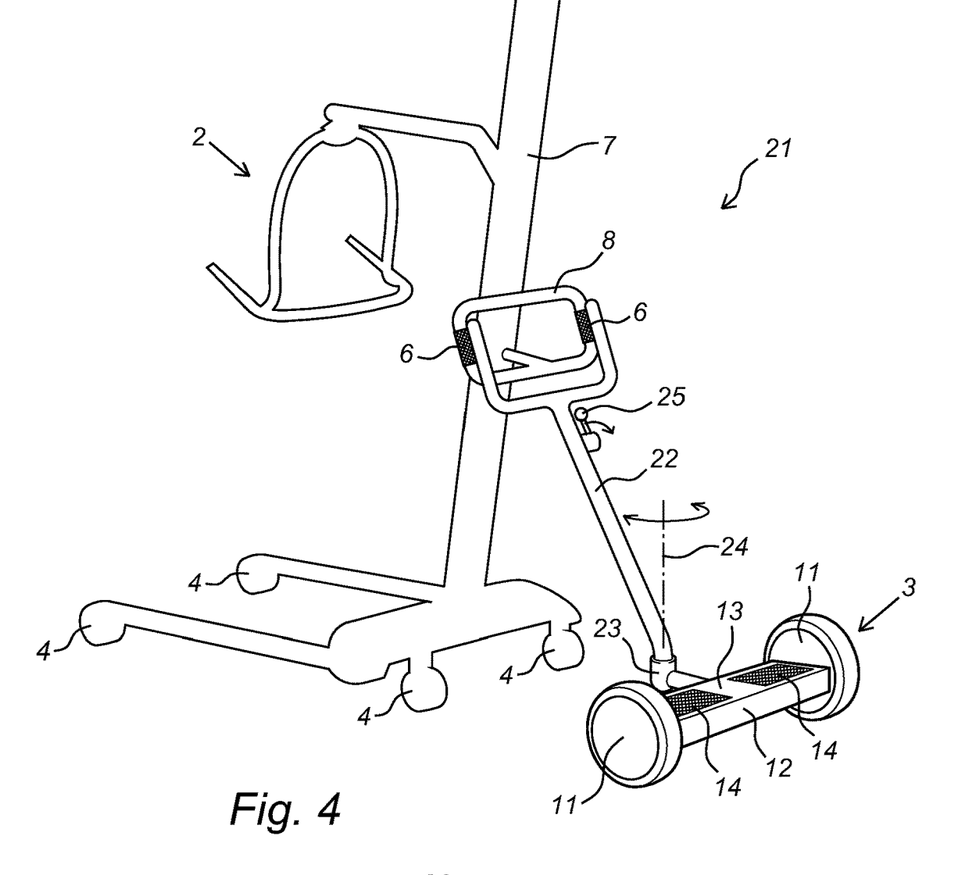
FIG. 4 shows a perspective view of an alternative embodiment of a medical transport device according to the present invention.

FIG. 4 shows a perspective view of an alternative embodiment of a medical transport device 21 according to the present invention. The coupling structure 22 differs from the coupling structure 5 used in the transport device 1 illustrated in FIG. 1 in that the coupling structure 22 comprises a joint 23 with a rotation axis 24 which is substantially perpendicular to the displacement plane 18. This joint 23 makes it possible to rotate the auxiliary drive 3 with respect to the support structure 2, by means of which the mutual orientation of the treadboard 12 and the driven supporting wheels 11 on the one hand and the mobile support structure 2 on the other hand can be modified. The auxiliary drive 3 is provided with a control element 25, by means of which the position of the auxiliary drive 3 with respect to the support structure 2 can be secured or can be released.

Figure 5:
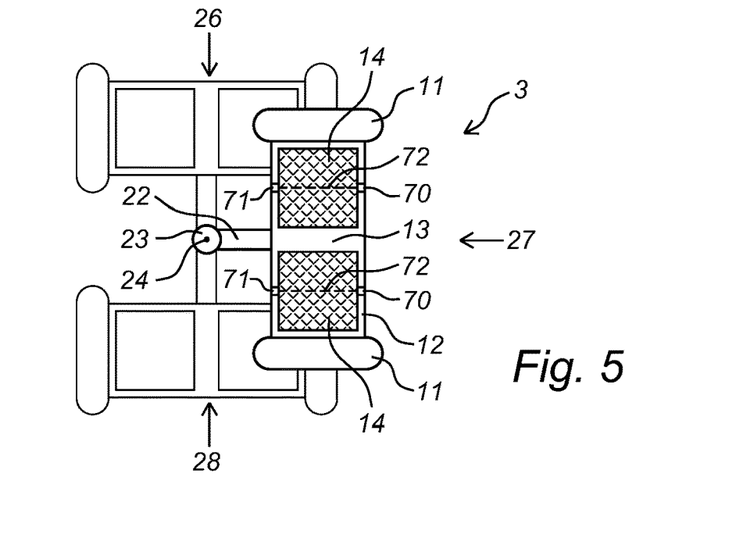
FIG. 5 shows a plan view of a part of the medical transport device as illustrated in FIG. 4.

FIG. 5 shows a plan view of a part of the medical transport device 21 as illustrated in FIG. 4. Specifically, (part of) the auxiliary drive 3 is illustrated which can be coupled to a support structure 2 by means of the coupling structure 22. In this case, the coupling structure 22 comprises the joint 23 with rotation axis 24 illustrated in FIG. 3. The mutual orientation of the treadboard 12 and the mobile support structure 2 can be modified by rotation of the auxiliary drive 3 about the rotation axis 24, in which the treadboard 12 can be fixed in several orientations 26, 27, 28 with respect to the mobile support structure 2. The treadboard 12 can be locked with respect to the mobile support structure 2 in each of the illustrated orientations. This makes it considerably easier for a caregiver to move the medical transport device 21 in a desired direction. The most common directions of travel are forward and backward, for which orientation 27 is most suitable, sideways to the left for which orientation 26 is most suitable and sideways to the right for which orientation 28 is most suitable. If desired, the caregiver may remain standing on the treadboard 12 during—optionally the release of and—the displacement (pivoting) of the treadboard 12 with respect to the support structure 2 and the optional locking. Preferably, the treadboard 12 is displaceably, preferably pivotably, connected to the joint 23 and/or to the coupling structure 22, in such a way that the treadboard 12 is displaceable in an upward and/or downward direction with respect to the joint 23 and/or the coupling structure 22. This makes it possible to arrange the treadboard 12, and the driven supporting wheels 11 connected thereto, at a distance from the surface (terra firma) and to optionally fold up the treadboard 12 in order to be able to facilitate the footprint and the handling of the transport device 21. In this case, it is conceivable for the auxiliary drive 3, in particular the coupling structure 22 and/or the joint 23, to comprise one or more forcing elements, such as springs, to force the treadboard 12 and the supporting wheels 11 connected thereto in an upward (and/or in a downward) direction. This makes it possible to arrange the treadboard 12 and the supporting wheels 11, in a position in which the caregiver does not apply a load (unloaded position), at a distance from the surface, for example a few centimetres, as a result of which the treadboard 12 can subsequently be pivoted manually by the caregiver with respect to the support structure 2 and/or the coupling structure 22 in a simple manner. An optical light source in the form of an infrared light source 70 and an optical sensor in the form of an infrared sensor 71 are arranged opposite one another (directly) on the bottom side of each of the foot pedals 14, in such a way that light source 70 and light sensor 71 are in optical contact with each other via light beam 72 in an unloaded state of the foot pedal 14. The optical contact will be interrupted by downward displacement and/or downward deformation of the foot pedal 14 as a result of the application of a load thereon, which is an indication that a caregiver has positioned himself on the treadboard 12. The light source 70 and the light sensor 71 are connected to a control unit (not shown) of the auxiliary drive 3. If the light source 70 and the light sensor 71 under a foot pedal 14 are in optical contact with each other, then the electric motor associated with the foot pedal 14 cannot be activated by means of the control unit. If the optical contact between the light source 70 and the light sensor 71 is interrupted, as a result of a caregiver applying a load on the foot pedal 14, then it is possible to activate the electric motor associated with the respective foot pedal 14. Whether or not the electric motor is activated depends on the way the caregiver applies a load to the foot pedal 14.

Figure 6:
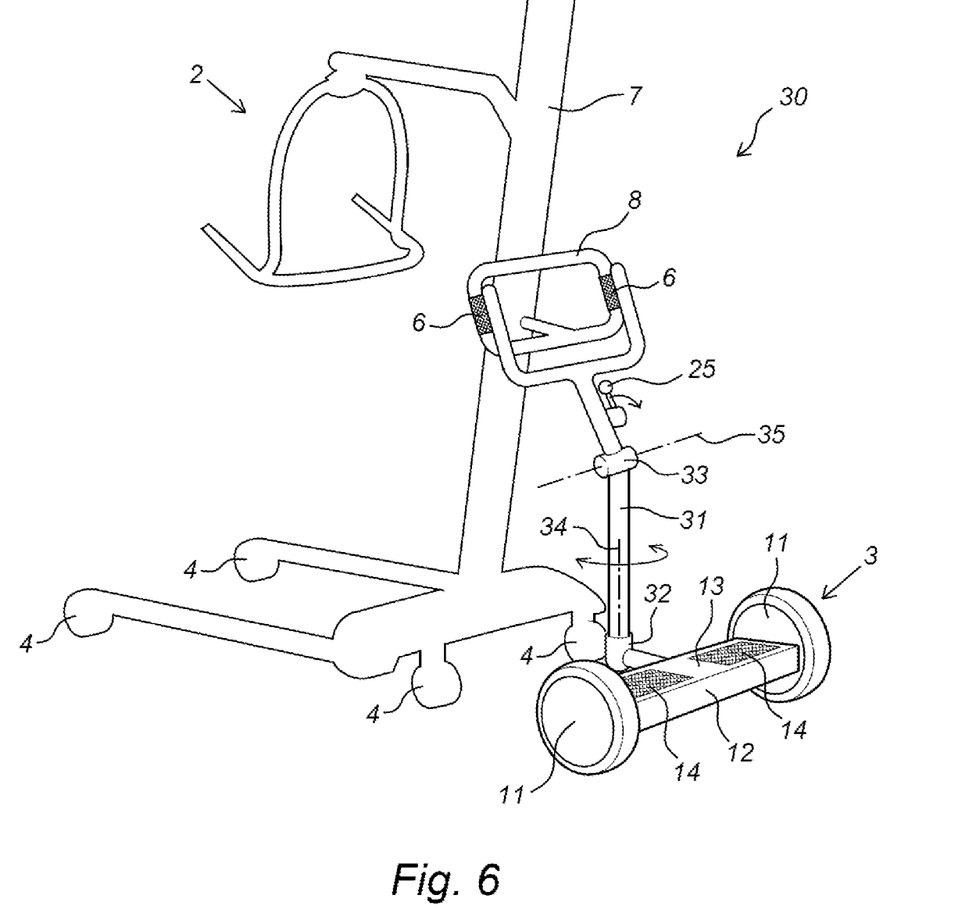
FIG. 6 shows a perspective view of another alternative embodiment of a medical transport device according to the present invention.

FIG. 6 shows a perspective view of another alternative embodiment of a medical transport device 30 according to the present invention. One difference with the previously illustrated embodiments is the coupling structure 31 which comprises two joints 32, 33. The first joint 32 has a rotation axis 34 which is substantially perpendicular to the displacement plane of the transport device and thus has a function which is identical to that of the joint 23 as used in the coupling structure 22 of the medical transport device 21, as illustrated in FIG. 4. The joint 32 therefore makes it possible to rotate the auxiliary drive 3 with respect to the support structure 2, as a result of which the mutual orientation of the treadboard 12 and the driven supporting wheels 11 on the one hand and the mobile support structure 2 on the other hand can be modified. The second joint 33 has a function which is identical to that of the joint 9 as used in the coupling structure 5 of the medical transport device 1, as illustrated in FIG. 1, and has a rotation axis 35, as a result of which the auxiliary drive 3 can rotate with respect to the support structure 2. If desired, the joint 33 may be provided with forcing means for forcing the auxiliary drive 3 in the direction of the displacement plane of the transport device 30.

Figure 7:
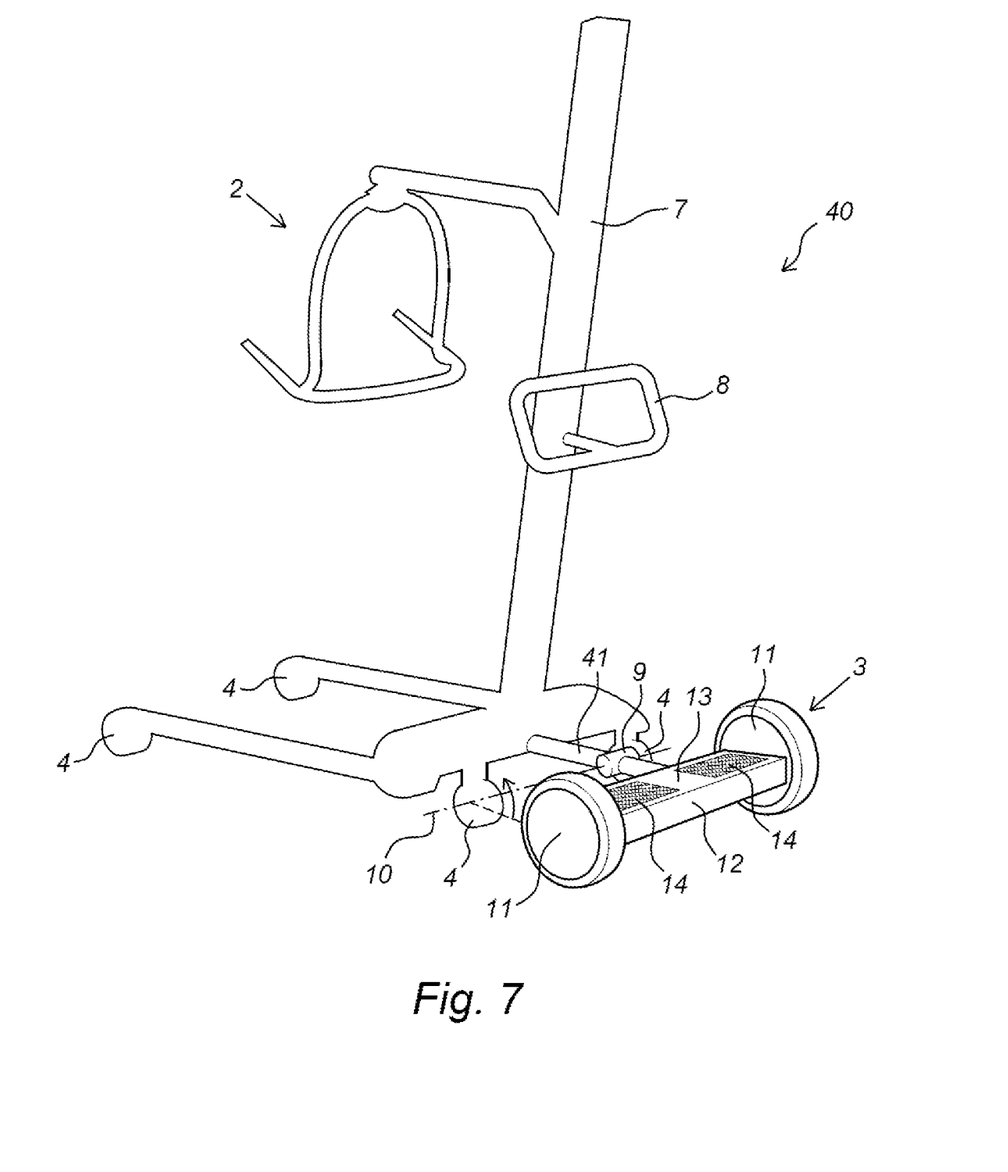
FIG. 7 shows a perspective view of yet another alternative embodiment of a medical transport device according to the present invention.

FIG. 7 shows a perspective view of yet another alternative embodiment of a medical transport device 40 according to the present invention. This embodiment is characterized by the use of a coupling structure 41 which is fixedly coupled to the support structure 2 and connects the support structure 2 and the auxiliary drive 3 to each other.

Figure 8:
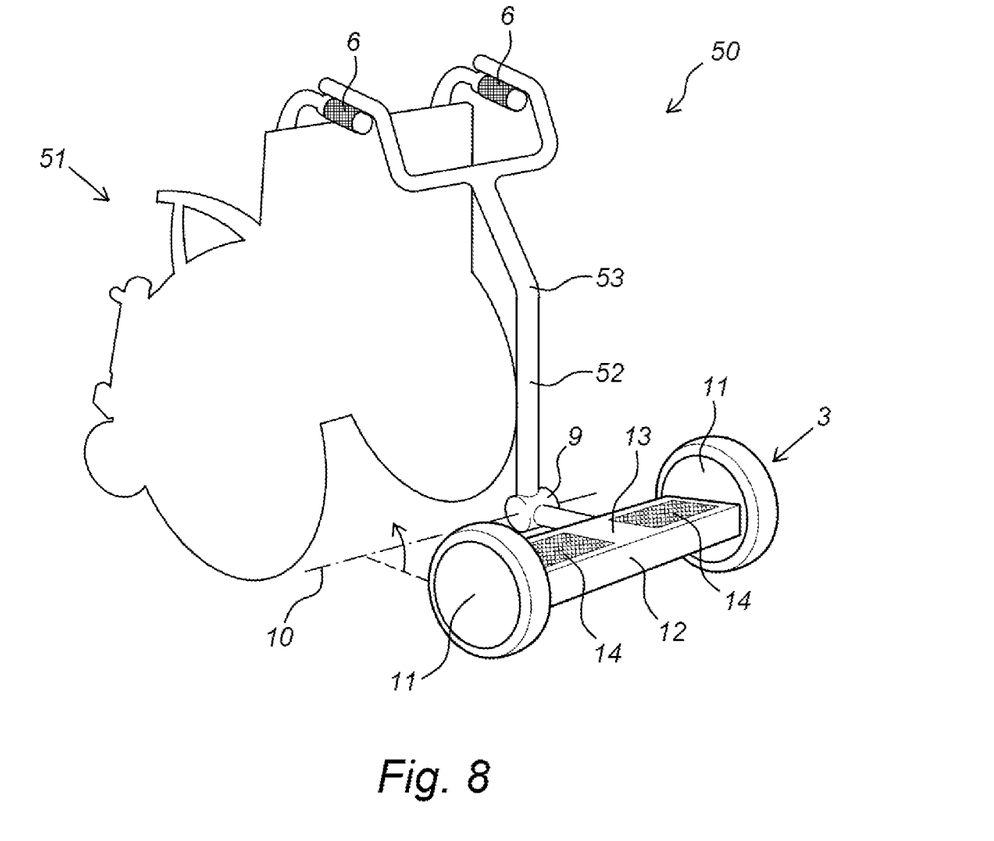
FIG. 8 shows a perspective view of yet another alternative embodiment of a medical transport device according to the present invention.

FIG. 8 shows a perspective view of yet another alternative embodiment of a medical transport device 50 according to the present invention. The transport device 50 comprises a mobile support structure 51 for supporting a dependent person, which is a wheelchair in the present embodiment. Via a coupling structure 52, the support structure 51 is connected to an auxiliary drive 3 for driving the transport device 50. The coupling structure 52 is provided with a bend 53 to limit the distance of the auxiliary drive 3 to the support structure 51, as a result of which the footprint of the transport device 50 remains limited for the purpose of manoeuvrability.

Figure 9:
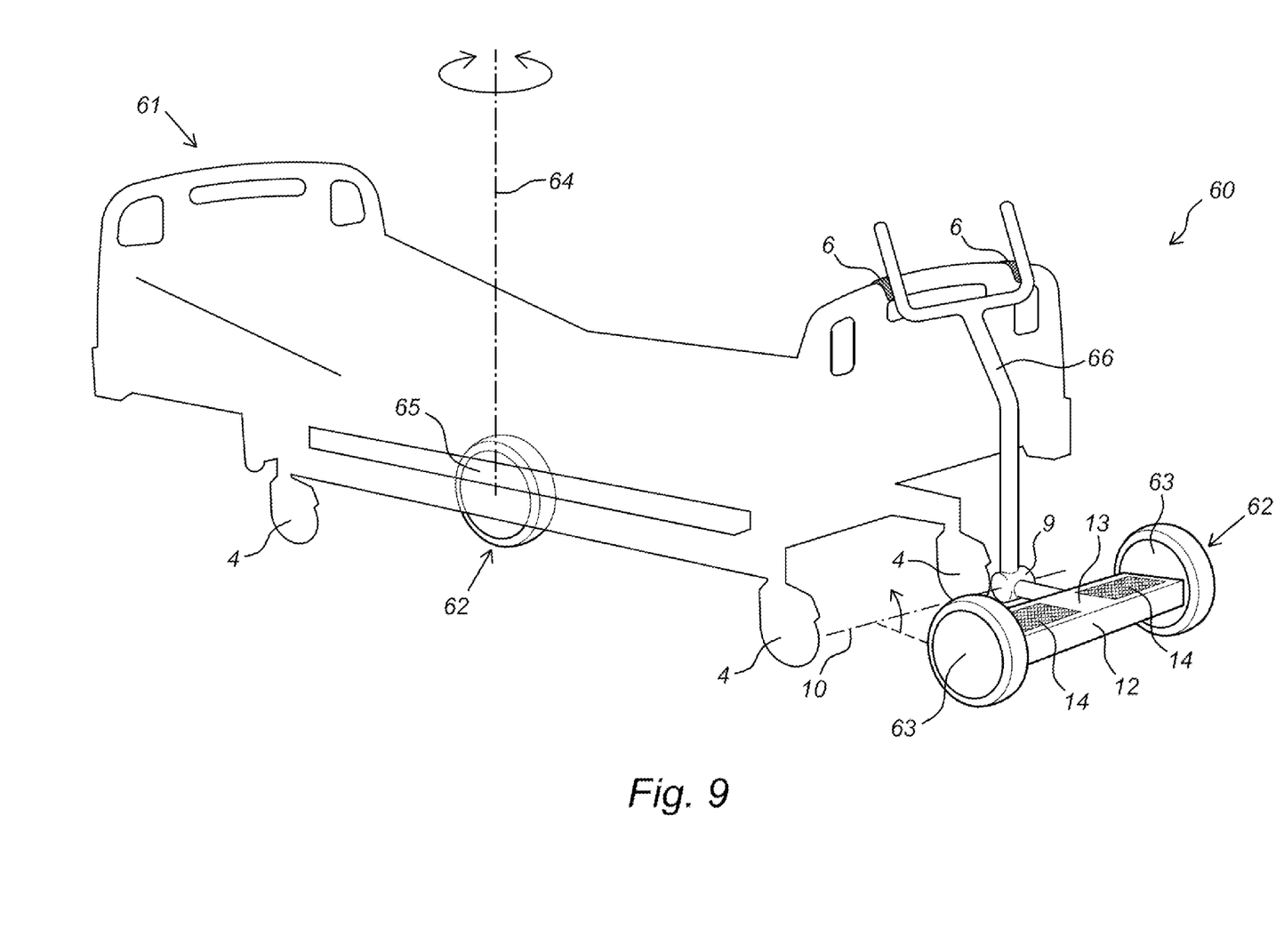
FIG. 9 shows a perspective view of yet another alternative embodiment of a medical transport device according to the present invention.

FIG. 9 shows a perspective view of yet another alternative embodiment of a medical transport device 60 according to the present invention. The transport device 60 comprises a mobile support structure 61 for supporting a dependent person, which is a hospital bed in the present embodiment. Here, the support structure 61 is connected to an auxiliary drive 62 for driving the transport device 60 as well. The auxiliary drive 62 comprises two, optionally driven, supporting wheels 63, which supporting wheels 63 support a treadboard 12 for a care-providing person. The treadboard 12 is connected to the support structure 61 by means of a coupling structure 66. In the illustrated transport device 60, the auxiliary drive 62 also comprises a driven supporting wheel 65 which is pivotable about a rotation axis 64 substantially perpendicular to the displacement plane and is actuated by foot pedals 14 which are incorporated in the support surface 13 of the treadboard 12, exactly as is the case in the above-described embodiments. By means of the foot pedals 14, the direction of rotation and the orientation of the driven supporting wheel 65 with respect to the mobile support structure and the treadboard can be manipulated.

Figure 10:
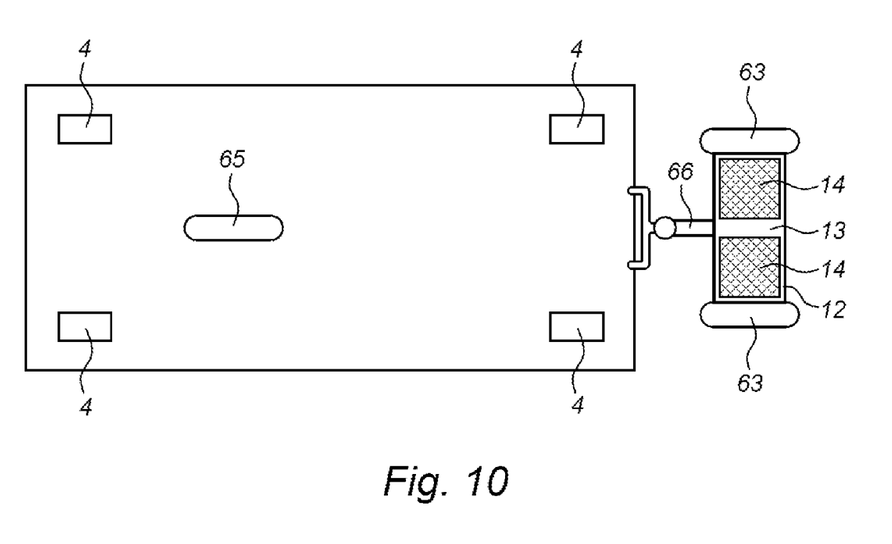
FIG. 10 shows a plan view of the medical transport device as illustrated in FIG. 9.

Finally, FIG. 10 shows a plan view of the medical transport device 60 as illustrated in FIG. 9. As can be seen, the driven, pivotable supporting wheel 65 is arranged under the support structure 61, in the width direction of the support structure 61, in a centred manner. However, it is also conceivable to use two or more driven, pivotable supporting wheels 65, resulting in an alternative position of the supporting wheels. It is also conceivable for the one or more driven, pivotable supporting wheels 65 to replace one or more of the non-driven supporting wheels 4 of the support structure 61. In the illustrated configuration, the non-driven supporting wheels 4 of the support structure 61 are preferably designed to be pivotable, in which case the travel direction of the transport device 60 depends on the orientation of the driven, pivotable supporting wheel 65. In this case, the pivotable supporting wheel 65 may be coupled to the foot pedals 14 and/or may only be designed to support in order to facilitate transportation of the transport device 60, for example, as a result of actuating the driven supporting wheels 63 by means of the foot pedals 14. In this last variant embodiment, the pivotable supporting wheel 65 will usually be coupled with a displacement sensor for detecting the displacement of the transport device 60, on the basis of which the supporting wheel 65 can supply additional force in order to move the transport device 60 more easily.

It will be clear that the invention is not limited to the exemplary embodiments illustrated and described here, but that countless variants are possible within the framework of the attached claims which will be obvious to the person skilled in the art. In this case, it is conceivable for various inventive concepts and/or technical measures of the above-described variant embodiments to be completely or partly combined without, in this case, moving away from the inventive idea described in the attached claims.

The verb "comprise" and its conjugations used in this patent is understood to not only mean "comprise", but also to mean the expressions "contain", "substantially contain", "formed by", and conjugations thereof.

The invention claimed is:

1. Medical transport device for transporting a patient comprising:
   a mobile support structure configured for supporting a patient, which mobile support structure is chosen from the group consisting of a hospital bed, a hoist lift, a stretcher and a wheelchair; and which mobile support structure is provided with at least one non-driven supporting wheel, and
   an auxiliary drive connected to the support structure for the motorised driving and control of the transport device, comprising:
      at least one driven supporting wheel,
      at least one electric motor coupled to the at least one driven supporting wheel for driving the at least one driven wheel,
      a treadboard for a care-providing person, which treadboard is provided with a foot control device coupled to the at least one electric motor and configured for actuating the at least one electric motor, in which the foot control device comprises at least one pressure-sensitive operating surface configured for actuating the at least one electric motor on the basis of a pressure exerted on the operating surface by a foot, wherein the transport direction and transport speed of the medical transport device is regulated by shifting the pressure applied by the care-providing person on the at least one pressure-sensitive operating surface,
      a coupling structure for coupling the auxiliary drive to the support structure, wherein the treadboard and/or the at least one driven supporting wheel is connected to the coupling structure in a pivotable manner allowing the treadboard and/or the at least one driven supporting wheel to pivot in an upward direction.

2. Transport device according to claim 1, in which the at least one pressure-sensitive operating surface forms part of a pressure switch.

3. Transport device according to claim 2, in which the at least one pressure-sensitive operating surface forms part of a piezo-electric sensor.

4. Transport device according to claim 3, in which the foot control device comprises at least two pressure-sensitive operating surfaces which are coupled to said electric motor, in which said at least two pressure-sensitive operating surfaces which are coupled to said electric motor are configured for actuating said electric motor in a forward and a reverse direction.

5. Transport device according to claim 4, in which the at least two pressure-sensitive operating surfaces which are coupled to said electric motor and which are configured for actuating said electric motor in a forward and reverse direction are collectively covered by a foot pedal which is connected to the operating surfaces and which has a profiled surface.

6. Transport device according to claim 1, in which the auxiliary drive comprises at least one first electric motor and at least one second electric motor, in which the auxiliary drive comprises at least one first driven supporting wheel coupled to the at least one first electric motor, and at least one second driven supporting wheel coupled to the at least one second electric motor.

7. Transport device according to claim 6, in which the foot control device comprises at least one first pressure-sensitive operating surface coupled to the at least one first electric motor, and at least one second operating surface coupled to the at least one second electric motor.

8. Transport device according to claim 6, in which the foot control device comprises at least two first pressure-sensitive operating surfaces which are coupled to said at least one first electric motor and at least two second pressure-sensitive operating surfaces which are coupled to said at least one second electric motor, in which each of said at least two first and second pressure-sensitive operating surfaces which are coupled to said at least one first and second electric motors respectively are configured for actuating said at least one first and second electric motors respectively in a forward and reverse opposite direction.

9. Transport device according to claim 1, in which the auxiliary drive comprises several driven supporting wheels which are substantially arranged on either side of the treadboard.

10. Transport device according to claim 1, in which the treadboard is movable with respect to the mobile support structure between an operational and a non-operational position, in which the treadboard, in the operational position, provides space to support a care-providing person and, in the non-operational position, occupies a reduced surface area projected onto a displacement plane compared to the operational position.

11. Transport device according to claim 1, in which the auxiliary drive comprises a coupling structure for coupling the auxiliary drive to the support structure, in which the coupling structure is configured for releasably coupling the auxiliary drive to the mobile support structure.

12. Transport device according to claim 1, in which the auxiliary drive comprises a control unit which is configured to actuate the at least one electric motor via operation of the foot control device.

13. Transport device according to claim 1, in which the foot control device comprises at least one gyroscope which is configured to actuate said at least one electric motor on the basis of tilting the treadboard by means of a foot.

14. Transport device according to claim 1, in which the auxiliary drive comprises at least one optical light source and at least one light sensor for detecting a light beam emitted by the light source, in which the light sensor, in an unloaded state of the treadboard, is in optical contact with the light source, and in which the light sensor, in a loaded state of the treadboard, is not in optical contact with the light source.

15. Transport device according to claim 1, wherein a speed of the medical transport device is regulated by shifting the pressure applied by the care-providing person on the at least one pressure-sensitive operating surface.

16. Transport device according to claim 1, wherein the mobile support structure comprises a hoist lift for patients.

17. Medical transport device for transporting a patient comprising:
a mobile support structure configured for supporting a patient, which mobile support structure is chosen from the group consisting of a hospital bed, a hoist lift, a stretcher and a wheelchair; and which mobile support structure is provided with at least one non-driven supporting wheel, and
an auxiliary drive connected to the support structure for the motorised driving and control of the transport device, comprising:
at least one driven supporting wheel,
at least one electric motor coupled to the at least one driven supporting wheel for driving the at least one driven wheel,
a treadboard for a care-providing person, which treadboard is provided with a foot control device coupled to the at least one electric motor and configured for actuating the at least one electric motor, in which the foot control device comprises at least one pressure-sensitive operating surface configured for actuating the at least one electric motor on the basis of a pressure exerted on the operating surface by a foot, wherein the transport direction and transport speed of the medical transport device is regulated by shifting the pressure applied by the care-providing person on the at least one pressure-sensitive operating surface,
a coupling structure for coupling the auxiliary drive to the support structure, wherein the treadboard and/or the at least one driven supporting wheel is connected to the coupling structure, and wherein at least part of the treadboard is connected to the support structure in a substantially fixed manner.

18. Auxiliary drive for the motorised displacement of a mobile support structure for patients comprising:
a coupling structure for coupling the auxiliary drive to the mobile support structure, which mobile support structure is chosen from the group consisting of a hospital bed, a hoist lift, a stretcher and a wheelchair;
at least one driven supporting wheel,
at least one electric motor coupled to the at least one driven wheel for driving the at least one driven wheel,
a treadboard for a care-providing person, which treadboard is provided with a foot control device coupled to the at least one electric motor and configured for actuating the at least one electric motor, in which the foot control device comprises at least one pressure-sensitive operating surface configured for actuating the at least one electric motor on the basis of a pressure exerted on the operating surface by a foot, wherein the transport direction and the transport speed of the auxiliary drive is regulated by shifting the pressure applied by the care-providing person on the at least one pressure-sensitive operating surface, and wherein the treadboard and/or the at least one driven support wheel is connected to the coupling structure in a pivotable manner allowing the treadboard and/or the at least one driven supporting wheel to pivot in an upward direction.

19. Method for the motorised displacement of a medical transport device for patients, wherein the method comprising the following steps:

A) providing the auxiliary drive of claim 18;
B) positioning a care-providing person on the treadboard, and
C) the care-providing person actuating at least one electric motor via the foot control device of the auxiliary drive, as a result of which at least one supporting wheel of the auxiliary drive is driven, resulting in a displacement of the transport device.

* * * * *